United States Patent [19]

Ohno et al.

[11] Patent Number: 5,136,667
[45] Date of Patent: Aug. 4, 1992

[54] FIBER OPTIC GYRO

[75] Inventors: Aritaka Ohno; Shinji Motohara, both of Tokyo, Japan

[73] Assignee: Japan Aviation Electronics Industry Limited, Tokyo, Japan

[21] Appl. No.: 759,436

[22] Filed: Sep. 13, 1991

[30] Foreign Application Priority Data

Sep. 21, 1990 [JP] Japan ................................. 2-252300

[51] Int. Cl.$^5$ .............................................. G02B 6/26
[52] U.S. Cl. ........................................ 385/11; 385/13; 356/350
[58] Field of Search ................... 385/1, 11, 12, 13, 14; 356/350

[56] References Cited

U.S. PATENT DOCUMENTS 4,712,306 12/1987 Cahill et al. ................ 356/350 X
5,054,923 12/1991 Okada ........................ 356/350

FOREIGN PATENT DOCUMENTS 0260885 3/1988 European Pat. Off. .

*Primary Examiner*—John D. Lee
*Assistant Examiner*—Stephen W. Barns
*Attorney, Agent, or Firm*—Pollock, Vande Sande and Priddy

[57] ABSTRACT

Light from a light source is linearly polarized by a polarizer and is then split by an optical splitter/coupler into two parts which are simultaneously coupled, as right-handed light and left-handed light, into both ends of an optical fiber coil. The right-handed light and left-handed light emitted from the ends of the optical fiber coil are combined by the optical splitter/coupler into interference light, which is extracted after passing through the polarizer and is converted into an electric signal corresponding to its intensity. The phase difference between the right-handed light and the left-handed light, corresponding to an angular rate applied to the optical fiber coil, is detected from the electric signal. A depolarizer is inserted in series at an arbitrary position in a loop from one end of the optical splitter/coupler to the other end thereof via the optical fiber coil. The depolarizer is so constructed that the difference between the difference in propagation time between perpendicularly intersecting polarized light components in the depolarizer and the difference in propagation time between perpendicularly intersecting polarized light components in the optical fiber coil is greater that the coherence time of light which passes through the loop.

4 Claims, 2 Drawing Sheets

FIBER OPTIC GYRO

BACKGROUND OF THE INVENTION

The present invention relates to a fiber optic gyro in which light propagates, as right-handed light and left-handed light, through a single-mode optical fiber coil or loop clockwise and counterclock-wise thereof and a phase difference therebetween is detected to sense an angular rate around the axis of the optical fiber coil which is applied thereto. More particularly, the invention pertains to a fiber optic gyro which employs a depolarizer for averting the influence of a polarization variation which occurs in the optical fiber coil.

FIG. 1 shows the basic arrangement of a conventional fiber gyro. Light emitted from a light source 11 passes through an optical coupler 12, such as an optical fiber coupler, and enters a polarizer 13, by which a polarized light component of only a predetermined polarization direction is extracted. The light from the polarizer 13 is split by an optical splitter/coupler 14, such as an optical fiber coupler, into two parts, one of which is coupled, as right-handed light, into one end of a single-mode optical fiber coil or loop 16 via a depolarizer 15 and the other end of the optical fiber coil 16 via an optical phase modulator 17. The right-handed light and the left-handed light, which have propagated through the optical fiber coil 16, return to the optical splitter/coupler 14, by which they are combined and interfere with each other. The resulting interference light enters the polarizer 13, by which a polarized light component of only a predetermined polarization direction is extracted, and the light having passed through the polarizer 13 is split or branched by the optical coupler 12 and is then supplied to a photodetector 18, in which it is converted to an electric signal corresponding to its intensity. The optical phase modulator 17 is driven by a periodic function signal, for example, a sine-wave signal, from a modulation signal generator 19 and the light which passes through the optical phase modulator 17 is phase modulated. The output of the photodetector 18 is applied to a synchronous detector 21, wherein it is synchronously detected by a reference signal from the modulation signal generator 19, and the detected output is provided to an output terminal 22.

In the case where no angular rate is being applied to the optical fiber coil 16 around its axis, there is no phase difference between the right-handed light and the left-handed light having propagated through the optical fiber coil 16, and the output of the synchronous detector 21 is also zero. When an angular rate is applied to the optical fiber coil 16 around its axis, a phase difference occurs between the right-handed light and the left-handed light correspondingly and the synchronous detector 21 produces an output of a polarity and a level corresponding to the direction and magnitude of the applied angular rate. Thus, the applied angular rate can be detected.

In this way, the fiber optic gyro detects the phase difference between the right-handed light and the left-handed light, but during the propagation of light through the optical fiber coil 16 polarized components are produced which are perpendicular to each other in their direction of polarization. Since the optical fiber coil 16 is slightly birefringent, the polarized light components polarized at right angles to each other differ in the propagation velocity in the optical fiber coil 16, so that interference between one of the polarized light components of the right-handed light and the other of the polarized light components of the left-handed light, which are combined by the optical splitter/coupler 14, will make it impossible to correctly detect the phase difference between the right-handed light and the left-handed light.

To avoid this, the prior art employs the depolarizer 15, by which the two polarized light components perpendicular to each other are made equal in intensity, different in phase and noncorrelating or noninterfering with each other (i.e. unpolarized) to thereby prevent interference between the one polarized light component of the right-handed light and the other polarized light component of the left-handed light.

The depolarizer 15 is usually a Lyot depolarizer with birefringent single-mode fibers (see Böhm et al., IEEE, vol. LT-1, No. 1, March 1983, page 71, for example), which is shown in FIG. 2. The Lyot depolarizer consists of two birefringent fibers 23 and 24 with different lengths $L_1$ and $2L_1$, which are spliced with their perpendicular principal axes $X_1$, $Y_1$ and $X_2$, $Y_2$ displaced 45 degrees apart at the joint. In order for the depolarizer to make every incident light unpolarized, it is necessary to satisfy the following two conditions:

(a) The two pairs of perpendicularly polarized components of the light emitted from the depolarizer bear the same intensity ratio. This condition can be fulfilled by splicing the optical fibers 23 and 24 with their principal axes displaced 45 degrees apart at the joint.

(b) No correlation (or no coherence) exists between the two pairs of perpendicularly polarized components of the light emitted from the depolarizer. This condition holds when the difference in the propagation time between the light polarized in the direction of the axis $X_1$ and the light polarized in the direction of the axis $Y_1$ in the optical fiber 23 of the length $L_1$ is greater than the coherence time of light. In this instance, the optical fiber 23 is required to have the length $L_1$ which satisfies this condition.

The condition (b) is given by the following equation:

$$L_1 \geq \frac{2\pi \cdot l_c}{\Delta \beta \cdot \lambda} \tag{1}$$

where $\Delta\beta$ is the difference in the propagation time per unit length between the light polarized in the Y-axis direction in the birefringent fiber (i.e. the birefringency per unit length), $l_c$ is the coherence length of light (coherence time × light velocity) and $\lambda$ is the wavelength of light.

Since the depolarizer 15 is used to convert the right-handed light into incoherent X-axis and Y-axis components and the left-handed light into incoherent X-axis and Y-axis components as described above, the X-axis component of the right-handed light and the Y-axis component of the left-handed light, which are combined by the optical splitter/coupler 14, do not interfere with each other and the Y-axis component of the right-handed light and the X-axis component of the left-handed light do non interfere either, but the X-axis components of the right-handed light and the left-handed light interfere with each other and the Y-axis components of the right-handed light and the left-handed light also interfere. Either one of the interference lights is extracted by the polarizer 13 and is then supplied to the photodetector 18, and consequently, the operation of the fiber optic gyro is free from the influence of the birefringency of the optical fiber coil 16.

In Electronics Letters, 12th, April 1984, vol. 20, No. 8, page 332, the zero-point stability of the output of the fiber optic gyro of the above-mentioned construction is expressed by the following equation:

$$|\phi_0| \leq \frac{1}{\sqrt{2}} \cdot \epsilon \cdot \eta \cdot \nu \quad (2)$$

where $\epsilon$ is an amplitude leakage coefficient of the polarizer 13, $\eta$ is the polarization of light which is combined by the optical splitter/coupler 14, $\nu$ is an improvement in the rotational angle of the optical fiber with respect to the polarizer 13 and $\phi_0$ is a phase error of the fiber optic gyro between right-handed light and left-handed light (the zero-point stability of the fiber optic gyro output).

In obtaining from Eq. (2) the zero-point stability $|\phi_0| = 1 \times 10^{-6}$ rad or so, which is necessary for a fiber optic gyro of medium precision, if $\epsilon = 0.01$ and $\nu = 0.01$ are used as typical values, then $\eta = 0.014$ and it is necessary to make the polarization of the output light low.

The depolarizer 15 is employed for reducing the polarization of the output light of the optical fiber coil 16, but in practice it is desired to reduce the diameter of the optical fiber coil 16. The bending or twisting of the optical fiber coil may sometimes produce therein birefringence, which causes an increase in the polarization $\eta$ of the output light; namely, even if the X-axis and Y-axis components of light are greatly displaced apart in phase by the depolarizer 15, the birefringence in the optical fiber coil 16 may sometimes serve to reduce the phase difference between both components, resulting in the deterioration of the zero-point stability of the fiber optic gyro.

According to Springer-Verlag, "Fiber Optic Rotation Sensor and Related Technology," 1982, pages 52-77, birefringence $\Delta\beta' = C \cdot (r/R)$ is produced in a single-mode optical fiber by its bending with a radius R, where C is $1.34 \times 10^{-6}$ rad/m and r is the radius of the optical fiber.

SUMMARY OF THE INVENTION

It is therefore an object of the present invention to provide a fiber optic gyro which is free from interference between perpendicularly intersecting polarized components of right-handed light and left-handed light, and hence is excellent in zero-point stability.

The fiber optic gyro of the present invention has an optical system wherein light emitted from a light source and having passed through an optical coupler and a polarizer is split by an optical splitter/coupler into two beams, the two beams are coupled, as right-handed light and left-handed light, into both ends of an optical fiber coil, the right-handed light and the left-handed light having propagated through the optical fiber coil are combined by the optical splitter/coupler into interference light, and a depolarizer is connected in series with the loop from one end of the optical splitter/coupler to the other end thereof via the optical fiber coil. The depolarizer is constructed so that the difference between the difference in propagation time between perpendicularly intersecting polarized components in the depolarizer and the difference in propagation time between perpendicularly intersecting polarized components in the optical fiber coil may be greater than the coherence time of the light which passes through the above-mentioned loop.

DESCRIPTION OF THE PREFERRED EMBODIMENTS

Figure 1:
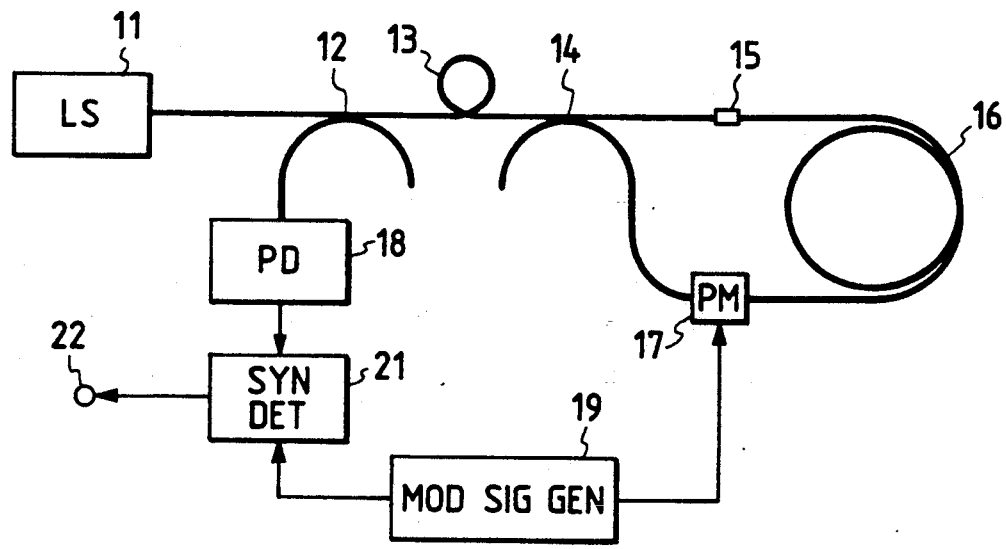
FIG. 1 is a block diagram showing a conventional fiber optic gyro.
Figure 3:
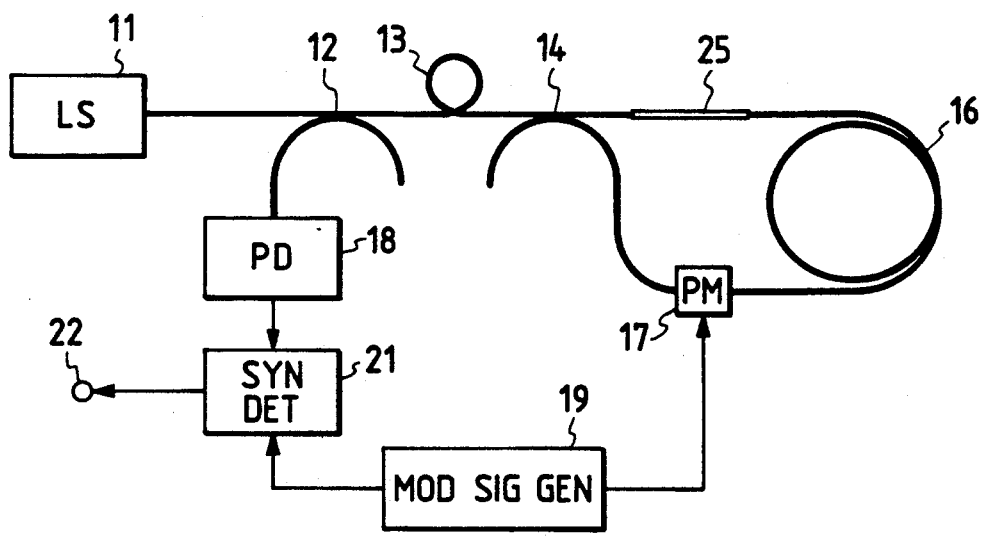
FIG. 3 is a block diagram illustrating an embodiment of the present invention.

FIG. 3 illustrates in block form an embodiment of the present invention, in which the parts corresponding to those in FIG. 1 are identified by the same reference numerals. This embodiment is identical in construction with the afore-mentioned prior art example except for the depolarizer itself.

The conditions required of the depolarizer 25 in the present invention are the afore-mentioned condition (a) and a condition expressed by the following equation substituted for Eq. (1) in the aforementioned condition (b).

$$l_c \leq \frac{\lambda}{2\pi} (\Delta\beta \cdot L_1 - \Delta\beta' \cdot L_0)$$

where $\Delta\beta$ is the birefringence per unit length of the birefringent fiber of the depolarizer 25 (if a beat length $l_B$ is used, $\Delta\beta = 2\pi/l_B$), $\Delta\beta'$ is the birefringence per unit length of the single mode optical fiber forming the optical fiber coil 16 and $L_0$ is the length of the optical fiber coil 16.

That is, the difference between the difference in propagation time between the X-axis and Y-axis components of light produced by the birefringence of the optical fiber coil 16 and the difference in propagation time between the X-axis and Y-axis components of light produced in the depolarizer 25 is greater than the coherence time of light, and the right-handed light and the left-handed light which propagates through the optical fiber coil 16 and are combined by the optical splitter/coupler 14 have no correlation (i.e. no coherence) between their polarized light components perpendicular to each other.

Eq. (3) for comparison with Eq. (1) can be rewritten as follows:

$$L_1 \geq \frac{2\pi \cdot l_c}{\Delta\beta \cdot \lambda} + \frac{\Delta\beta'}{\Delta\beta} \cdot L_0 \quad (3')$$

Figure 2:
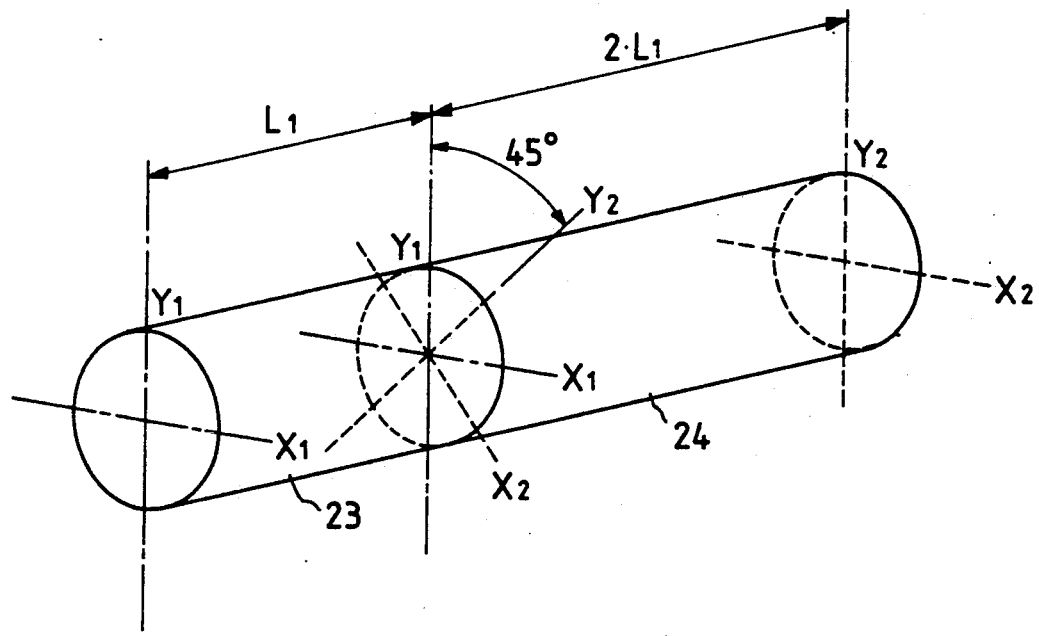
FIG. 2 is a perspective view of a depolarizer.

In the FIG. 3 embodiment the Lyot depolarizer shown in FIG. 2 is made longer than in the prior art so as to fulfil the condition of Eq. (3) (or (3')). That is, in the case where $L_0 = 350$ m, $l_B = 2$ mm, $\Delta\beta' = 5$ rad/m, $l_c = 50$ μm and $\lambda = 0.83$ μm, the length $L_1$ of the optical fiber 23 is 20 cm in the prior art, but in this embodiment the length $L_1$ is 5 m.

Figure 4A:
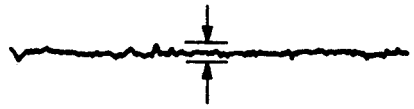
FIG. 4A is a waveform diagram showing an example of the zero-point output of the fiber optic gyro according to the present invention.
Figure 4B:
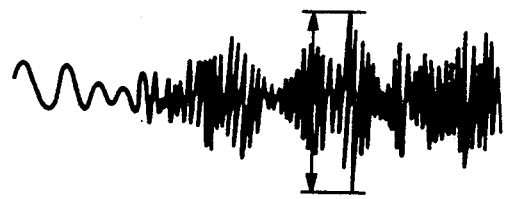
FIG. 4B is a waveform diagram showing an example of the zero-point output of the conventional fiber optic gyro.

A zero-point drift of the output of the conventional fiber optic gyro depicted in FIG. 1 is relatively large as shown in FIG. 4B, but the zero-point drift in the FIG. 3 embodiment which employs such a depolarizer as mentioned above is less than 1/10 that of the conventional gyro as shown in FIG. 4A.

Figure 5:
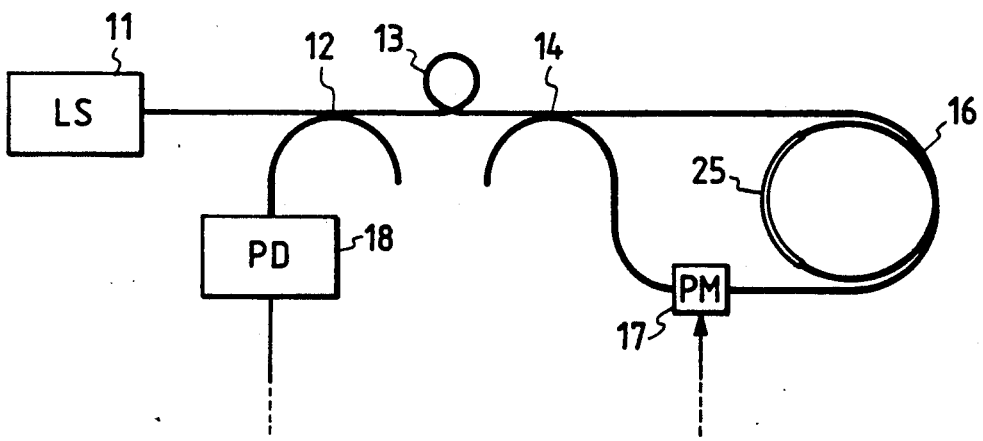
FIG. 5 is a block diagram illustrating the principal part of another embodiment of the present invention.

The depolarizer 25 may be inserted in any part of the loop starting from the optical splitter/coupler 14 and returning thereto via the optical fiber coil 16, for example, at the center of the optical fiber coil 16 as shown in FIG. 5. Although in the above depolarizer 25 the length $L_1$ of the optical fiber 23 is made large, the beat length $l_B$ may also be reduced. Alternatively, it is possible to decrease the coherence length $l_c$ of light, make the radius of the optical fiber coil 16 large (i.e. reduce the birefringence $\Delta\beta'$), or reduce the length $L_0$ of the loop. The depolarizer 25 may be formed using birefringent crystal as well as optical fibers. While in the above the present invention has been described as being applied to an open loop type fiber optic gyro, the invention is also applicable to a closed loop type fiber optic gyro.

As described above, according to the present invention, the polarization of output light from the depolarizer does not vary, even if it propagates through a single-mode optical fiber coil and there is no possibility of interference between perpendicularly intersecting polarized components of right-handed light and left-handed light from the optical fiber coil. Thus, the fiber optic gyro of the present invention is excellent in zero-point stability, and hence permits correct measurement of the input angular rate.

It will be apparent that many modifications and variations may be effected without departing from the scope of the novel concepts of the present invention.

What is claimed is:

1. In a fiber optic gyro of the type wherein light from a light source is split by optical splitter/coupler means and is coupled, as right-handed light and left-handed light, into both ends of a single-mode optical fiber coil, said right-handed light and said left-handed light having propagated through said optical fiber coil are caused by said optical splitter/coupler means to interfere with each other, said interference light is branched by an optical coupler to a photodetector and is thereby converted to an electric signal corresponding to said branched interference light, an angular rate applied to said optical fiber coil around its axis is detected from said electric signal, and a depolarizer is inserted in series in a loop through which said light from said optical splitter/coupler means propagates thereto, the improvement wherein said depolarizer is so constructed that the difference between the difference in propagation time between perpendicularly intersecting polarized light components in said depolarizer and the difference in propagation time between perpendicularly intersecting polarized light components in said optical fiber coil is greater than a coherence time of light passing through said loop, said depolarizer being composed of first and second tandem-connected birefringent optical fibers with lengths $L_1$ and $2L_1$, principal axes of said first and second birefringent optical fibers being displaced 45 degrees apart, and letting the birefringence per unit length of said first and second birefringent optical fibers be represented by $\Delta\beta$, the wavelength and coherence length of light used be represented by $\lambda$ and $l_c$, respectively, and the length and birefringence per unit length of an optical fiber forming said optical fiber coil be represented by $L_0$ and $\Delta\beta'$, respectively, the following condition is satisfied:

$$l_c \leq \frac{\lambda}{2\pi} (\Delta\beta \cdot L_1 - \Delta\beta' \cdot L_0)$$

2. The fiber optic gyro of claim 1, wherein said depolarizer is inserted between said optical splitter/coupler means and one end of said optical fiber coil.

3. The fiber optic gyro of claim 1, wherein said depolarizer is inserted in an intermediate portion of said single-mode optical fiber forming said optical fiber coil.

4. The fiber optic gyro of claim 1, 2, or 3, wherein polarizer means is inserted between said optical splitter/coupler means and said optical coupler.

* * * * *